(12) United States Patent
Moon et al.

(10) Patent No.: US 7,283,668 B2
(45) Date of Patent: Oct. 16, 2007

(54) METHOD AND APPARATUS FOR COLOR-BASED OBJECT TRACKING IN VIDEO SEQUENCES

(75) Inventors: Young-su Moon, Seoul (KR); Chang-yeong Kim, Yongin (KR)

(73) Assignee: Samsung Electronics Co., Ltd., Suwon, Kyungki-do (KR)

( * ) Notice: Subject to any disclaimer, the term of this patent is extended or adjusted under 35 U.S.C. 154(b) by 0 days.

(21) Appl. No.: 11/700,035

(22) Filed: Jan. 31, 2007

(65) Prior Publication Data

US 2007/0127775 A1 Jun. 7, 2007

Related U.S. Application Data

(62) Division of application No. 10/329,469, filed on Dec. 27, 2002, now Pat. No. 7,187,783.

(30) Foreign Application Priority Data

Jan. 8, 2002 (KR) .................................. 2002-989

(51) Int. Cl.
*G06K 9/00* (2006.01)
(52) U.S. Cl. ...................... 382/168; 382/103
(58) Field of Classification Search ................ 382/103, 382/168, 171
See application file for complete search history.

(56) References Cited

U.S. PATENT DOCUMENTS 5,473,369 A 12/1995 Abe (Continued)

FOREIGN PATENT DOCUMENTS

| KR | 2001-55492 | 7/2001 |
|---|---|---|
| KR | 2001-57810 | 7/2001 |

OTHER PUBLICATIONS

Kass et al., Snakes: Active Contour Models, International Journal of Computer Vision, pp. 321-331, 1988, Kluwer Academic Publishers.

(Continued)

*Primary Examiner*—Matthew C. Bella
*Assistant Examiner*—Tom Y Lu
(74) *Attorney, Agent, or Firm*—Buchanan Ingersoll & Rooney PC (57) ABSTRACT

A method and apparatus for tracking a color-based object in video sequences are provided. According to the method, an initial object area in one frame of video sequences desired to be tracked is assigned, and an initial object effective window containing the initial object area is assigned. A frame following the frame containing the assigned initial object area is received as a newly input image, and an object search window containing the initial object area for tracking and the initial object effective window in the newly input image is assigned. Then, the model histogram of the initial object area corresponding to a predetermined bin resolution value and the input histogram of the image in the object search window are calculated. From the calculated object probability image, using a predetermined method, a new object area to which the initial object area moved is obtained in the next frame in which the initial object area of the frame desired to be tracked is given as a previous (tracked) object area. By doing so, the object in video sequences is tracked. Accordingly, using the continuously extracted video object region information, an object-based interactive-type additional information service function in movies, TV programs, and CFs can be implemented effectively.

4 Claims, 7 Drawing Sheets

U.S. PATENT DOCUMENTS

| | | | |
|---|---|---|---|
| 5,845,009 | A | 12/1998 | Marks et al. |
| 6,226,388 | B1 | 5/2001 | Qian et al. |
| 6,259,802 | B1 | 7/2001 | Jolly et al. |
| 6,266,443 | B1 | 7/2001 | Vetro et al. |
| 6,269,172 | B1 | 7/2001 | Rehg et al. |
| 6,363,160 | B1 * | 3/2002 | Bradski et al. ............. 382/103 |
| 6,381,363 | B1 * | 4/2002 | Murching et al. .......... 382/164 |
| 6,724,915 | B1 | 4/2004 | Toklu et al. |

OTHER PUBLICATIONS

Swain et al., Color Indexing, International Journal of Computer Vision, vol. 7:1, pp. 11-32, 1991, Kluwer Academic Publishers.

G R. Bradski, Computer Vision Face Tracking as a Component of a Perceptual User Perceptual User Interface, Fourth IEEE Workshop on Applications of Computer Vision, pp. 214-219, Prince, New Jersey, 1998.

D. Comaniciu et al. Real-Time Tracking of Non-Rigit Objects Using Mean Shift, IEEE Conference on Computer Vision and Pattern Recognition, vol. 11pp. 142-149, Hilton Head, South Carolina, 2000.

English translation of Notice to Submit Response in corresponding Korean Application No. 10-2002-0000989, dated Mar. 15, 2004 and citing the above-two documents.

* cited by examiner

METHOD AND APPARATUS FOR COLOR-BASED OBJECT TRACKING IN VIDEO SEQUENCES

This application claims the priority of Korean Patent Application No. 2002-989, filed Jan. 8, 2002, in the Korean Intellectual Property Office. The entire content of this application is incorporated herein by reference.

"This application is a division of U.S. patent application Ser. No. 10/329,469, filed Dec. 27, 2002, now U.S. Pat. No. 7,187,783."

BACKGROUND OF THE INVENTION

1. Field of the Invention

The present invention relates to handling a particular part in multimedia data, and more particularly, to a method and apparatus for tracking a particular object in video sequence frames.

2. Description of the Related Art

As multimedia environments are becoming more diversified, demands for continuously tracking or extracting an object area in which a user is interested in ordinary video sequences such as movies, TV programs, and Commercial Films (CFs) are gradually increasing.

Technologies for tracking an object area in video sequences can be broadly divided into the following four methods.

First, the most widely used one is a technology based on block matching. This technology is relatively easy to implement, and if the shape of an object rarely changes, shows a satisfying matching (or tracking) performance between frames. Therefore, this method is basically used for estimating a block motion vector between frames in the MPEG-1, and MPEG-2 that are standard technologies for moving picture compression. However, if complex object transformation (scale change, rotation, or non-rigid motion) occurs in continuous frames, the probability of failure in block matching-based object tracking increases.

Secondly, there is a method based on a geometric model in which geometric characteristics of an object are modeled (e.g., wire-frame model) and using this, the model is found in input images [U.S. Pat. No. 6,269,172]. This method works well for transformation of a rigid body although it has partial occlusion. However, the implementation is complicated and needs a lot of calculation, and this method is not appropriate to non-rigid body object transformation. In addition, for each object, a separate model should be built.

Thirdly, there is a method based on an active contour model (or snake) [Kass et al., "Snakes: Active Contours Models", IJCV, Vol. 2, 1988, pp. 321-331] [U.S. Pat. No. 6,266,443] [U.S. Pat. No. 6,259,802]. Like the above geometric model-based method, this method needs to set an appropriate contour model for a particular object, but shows effective tracking results for non-rigid body transformation to some degree. However, this method reveals disadvantage of being easily trapped at neighboring background image features.

Finally, there is a method based on color histogram information. This method shows relatively satisfying tracking results for complex object transformation and partial occlusion, and above all, has the advantage of fast processing speed [Swain, et al., "Color Indexing", IJVC, Vol. 7, 1991, pp. 11-32] [U.S. Pat. No. 5,845,009][U.S. Pat. No. 6,226,388]. However, when a color similar to that of an object which is tracked is distributed in background areas adjacent to the object, the probability of failure in object tracking increases because this method gives a poor separation between the object and the similarly colored background. Since most technologies included in this method utilize templates having particular shapes (e.g., rectangle, ellipse) to represent object areas, they cannot provide accurate shape information of the objects in continuous object tracking process, and therefore, cannot effectively provide an adaptive compensation mechanism for both complex object shape deformation due to non-rigid object motion and the temporal change of the object color distribution due to illumination variation [G. R. Bradski, "Computer vision face tracking as a component of a perceptual user interface", IEEE Work. On Applic. Comp. Vis., Princeton, 214-219, 1998] [D. Comaniciu, V. Ramesh, and P. Meer, "Real-time tracking of Non-rigid objects using mean shift", IEEE Conference on Computer Vision and Pattern Recognition, Hilton Head, S.C., June 2000, vol.II, 142-149.]. Also, the tracking methods basically based on a color histogram have a problem of the sensitivity of the tracking performance to the set values of the color histogram bin resolution.

SUMMARY OF THE INVENTION

To solve the above problems, it is a first objective of the present invention to provide a method and apparatus in which an object in video sequences is solidly tracked by compensating for color information changes in an object area due to lighting changes, and optimal color histogram bin resolution appropriate to each moving picture-is automatically determined in the beginning of the object tracking task.

It is a second objective of the present invention to provide a computer readable recording medium having embodied thereon the above methods.

To accomplish the first objective of the present invention, there is provided a method for tracking a color-based object in video sequences formed with frames, the method comprising (a) assigning an initial object area in one frame of the video sequences desired to be tracked, assigning an initial object effective window containing the initial object area, and calculating a model color histogram of the object area using a predetermined bin resolution; (b) receiving a frame following the frame containing the initial object area assigned in step (a) as a newly input image, and assigning an object search window containing an object area in the newly input image to which the initial object area for tracking were transformed and moved, and the initial object effective window assigned in step (a); (c) calculating an input color histogram which is a color histogram of the image in the object search window, using the predetermined bin resolution used in step (a); (d) calculating an object probability image in the object search window, by using the model color histogram of the initial object area and the input color histogram of the image in the object search window; (e) updating the object effective window of the object area to which the initial object area was transformed and moved, using the object probability image and the initial object effective window so that the area of the object which is the target of tracking is included in the updated new object effective window; and (f) detecting a new object area in a newly input image, using a predetermined method, from the object probability image obtained in step (d) in the new object effective window finally updated in step (e).

Also, to accomplish the first objective of the present invention, there is provided an apparatus for tracking a color-based object in video sequences formed with frames comprising an image input means through which the video sequences are input; a histogram calculating means which calculates a histogram of an image in an area assigned in the video sequence frame, by using a predetermined bin resolution; a means which assigns an initial object area desired to be tracked, in one frame of the video sequences input through the image input means, and sets an initial object effective window containing the initial object area; an object search window assigning means which receives a frame following the frame containing the initial object area, through the image input means, as a new input image, and assigns an object search window containing an object area appearing in the new input image to which the initial object area for tracking were transformed and moved, and the set initial object effective window; an object probability image calculating means which calculates an object probability image of the object search window, by using a model histogram which is a histogram of the initial object area calculated by using the histogram calculating means, and an input histogram which is a histogram of an image in the object search window; an object effective window updating means which updates an object effective window of an object area to which the initial object area were transformed and moved, from the object probability image and the initial object effective window so that the object being tracked is included in the updated object effective window; and a means which detects a new object area in a new input image frame, by using a predetermined method, from the object probability image in the object effective window which is finally updated in the object effective window updating means.

Also, to accomplish the first objective of the present invention, there is provided a method for optimizing the bin resolution of a color histogram for robustly tracking an object in video sequences, the method comprising (a) assigning an initial object area in one frame of the video sequences desired to be tracked and assigning an initial object effective window containing the initial object area; (b) assigning an object search window containing the initial object effective window assigned in step (a), in the frame containing the object area assigned in step (a); (c) calculating a model histogram of the initial object area corresponding to a predetermined bin resolution value and an input histogram of an image in the object search window; (d) calculating an object probability image of the image in the object search window, by using the model histogram and the input histogram; (e) detecting an object area in the frame of step (a) by using a predetermined method, from the object probability image calculated in step (d); (f) calculating an object detection performance index which is determined by how much the initial object area assigned in step (a) and the new object area obtained in step (e) coincide, and how well the initial object area is distinguished from an adjacent background area in the object probability image calculated in step (d); and (g) calculating the object detection performance index for each of all bin resolution values, by repeatedly performing steps (c) through (f) using all bin resolution values that are available for assigning, and determining a bin resolution value that provides the maximum object detection performance index, as an optimized bin resolution value.

Also, to accomplish the first objective of the present invention, there is provided an apparatus for optimizing the bin resolution of a color histogram for robustly tracking an object in video sequences comprising an image input means through which the video sequences are input; a histogram calculating means which calculates a histogram of an image in an area assigned in the video sequence frame, by using a predetermined bin resolution; a means which assigns an initial object area desired to be tracked, in one frame of the video sequences input through the image input means, and sets an initial object effective window containing the initial object area; an object search window assigning means which assigns an object search window containing the set initial object effective window in the frame containing the initial object area; an object probability image calculating means which calculates an object probability image of an image in the object search window, by using a model histogram which is a histogram of the initial object area calculated by using the histogram calculating means, and an input histogram which is a histogram of an image in the object search window; a means which again detects the object area in the first frame by binarizing the calculated object probability image; a means which determines an object detection performance index which indicates how much the initial object area and the object area obtained in the means, which again detects the object area, coincide, and how well the initial object area is distinguished from an adjacent background area in the object probability image obtained in the object probability image calculating means; and a means which calculates the object detection performance index for each of all bin resolution values that the object detection performance index determining means is capable of assigning, and, determines a bin resolution value which provides the maximum object detection performance index among the calculated indexes, as an optimized bin resolution.

To accomplish the second objective of the present invention, there is provided a computer readable medium having embodied thereon a computer program for tracking a color-based object in video sequences formed with frames, wherein the tracking of a color-based object comprises all steps of the method for tracking a color-based object.

Also, to accomplish the second objective of the present invention, there is provided a computer readable medium having embodied thereon a computer program for optimizing the bin resolution of a color histogram for robustly tracking an object in video sequences, wherein the optimizing of the bin resolution of a color histogram comprises all steps of the method for optimizing the bin resolution of a color histogram.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Figure 1:
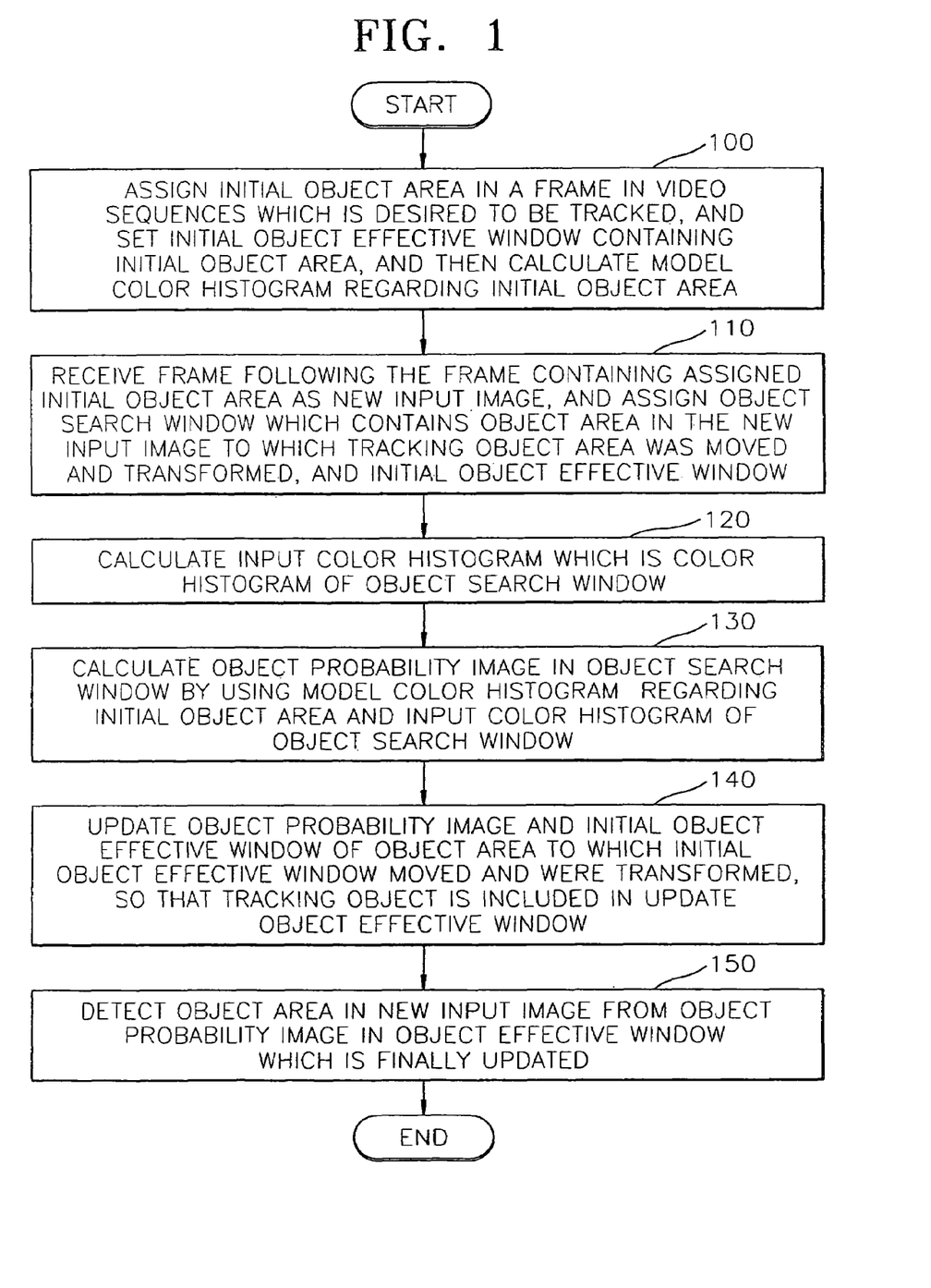
FIG. 1 is a schematic diagram showing the flow of a method for tracking a color-based object in video sequences formed with frames according to the present invention.

FIG. 1 is a schematic diagram showing the flow of a method for tracking a color-based object in moving image formed with frames according to the present invention. In the method, an initial object area in a frame in moving image which is desired to be tracked is assigned, an initial object effective window containing the initial object area is assigned, and a model color histogram of the initial object area is calculated in step 100. A frame following the frame containing the initial object area assigned in step 100 is received as a new input image, and an object search window which contains an object area in the new input image to which the object area for tracking was moved and transformed, and the initial object effective window assigned in step 100, is assigned in step 110. The input color histogram which is a color histogram within the object search window is calculated using the predetermined bin resolution used in step 100 in step 120. Using the model color histogram of the image in the initial object area and the input color histogram of the object search window, the object probability image in the object search window is calculated in step 130. The initial object effective window of the object area to which the object area for tracking was moved and transformed are updated so that the object to be tracked is included in the update object effective window in step 140. Then, From the object probability image in the object effective window which is finally updated in step 140, using a predetermined method, a new object area in a new input image is detected in step 150. By doing so, the object assigned in step 100 is tracked.

Figure 2:
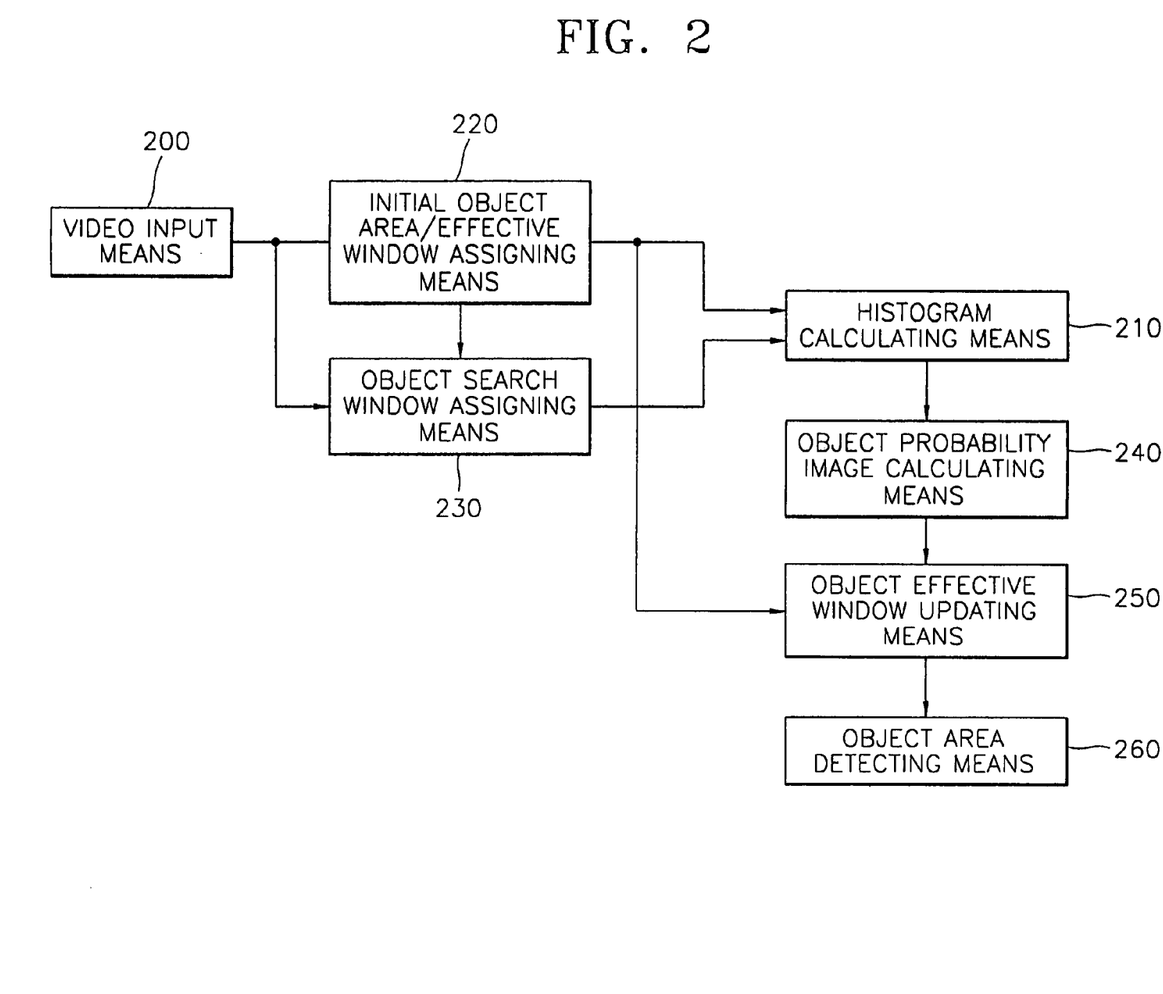
FIG. 2 is a block diagram of the structure of an apparatus for tracking a color-based object in video sequences formed with frames according to the present invention.

FIG. 2 is a block diagram of the structure of an apparatus for tracking a color-based object in moving image formed with frames according to the present invention. The apparatus is formed with means 200 through 260. A video input means 200 receives moving image. A histogram calculating means 210 calculates a color histogram of an area assigned in a vide image frame, using a predetermined bin resolution. A means 220 assigns an initial object area desired to be tracked in a frame of a moving image input through the image input means 200, and automatically sets an initial object effective window containing the initial object area. A means 230 receives a frame which follows the frame containing the initial object area, as a new input image through the image input means 200, and assigns an object search window containing an object area to which the object area for tracking included in the new input image was transformed and moved, and the assigned object effective window. A means 240 calculates the object probability image of the color image within the object search window, using a model histogram which is the histogram of the initial object area calculated using the histogram calculating means 210, and an input histogram which is the histogram of the object search window. An object effective window updating means 250 updates the object effective window of the object area to which the object area for tracking was transformed and moved so that the object being tracked is included in the updated object effective window. A means 260 detects a new object area in the new input image frame from the object probability image in the effective window which is finally updated in the object effective updating means 250, using a predetermined method.

Referring to the method of FIG. 1 and the structure of FIG. 2, the operation of a preferred embodiment for tracking and detecting an object in moving image according to the present invention will now be explained in detail.

In the present invention, in order to track an object quickly and robustly in moving image, the color histogram of an object area is basically used as the image characteristic for object area matching and detection between frames. In order to improve the tracking algorithm performance of this method, a method for determining an optimal color histogram bin resolution which adaptively changes according to an image is disclosed. Also, object area (or an object boundary) information is made to be provided for each frame, and using the object area information, object color information (model color histogram) is made to be efficiently updated for robustly tracking an object even under continuous lighting changes.

Figure 3:
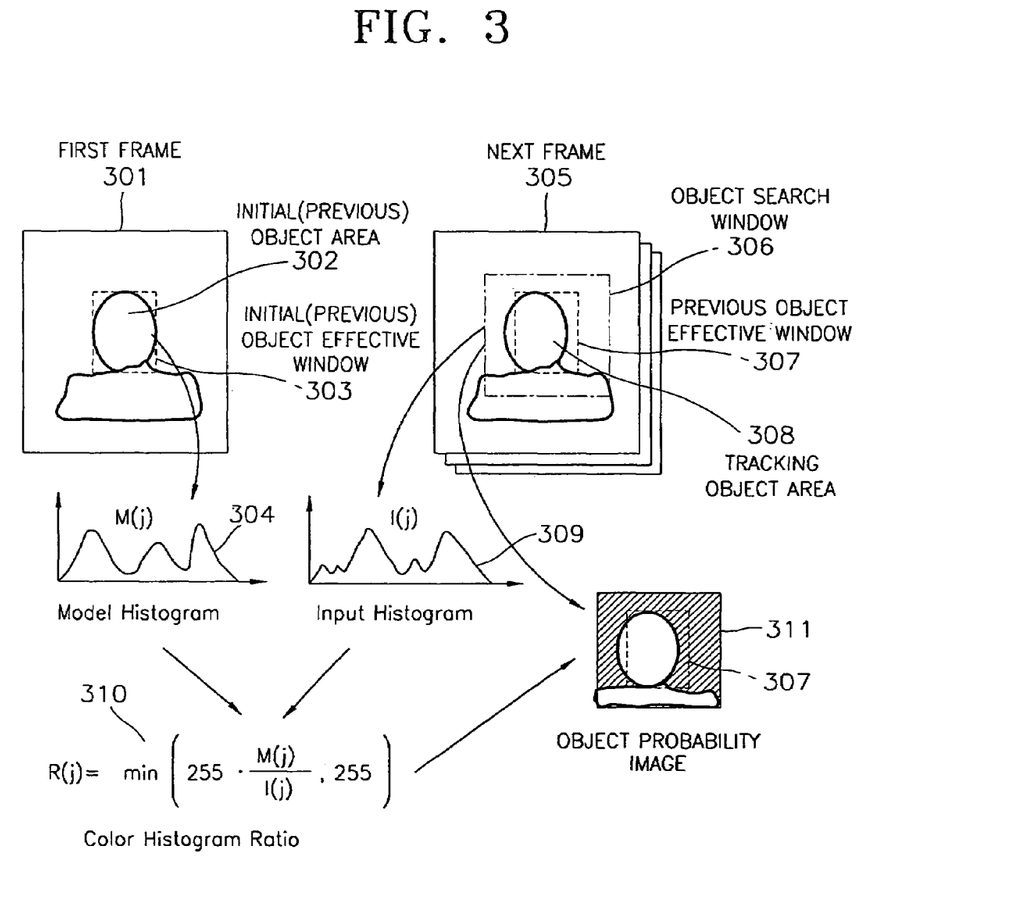
FIG. 3 is a diagram explaining a principle for tracking an object according to the present invention in which a process for calculating an object probability image of an input image in an object search window is particularly explained.

FIG. 3 is a diagram explaining a principle for tracking an object according to the present invention in which a process for calculating an object probability image within an object search window is particularly explained. This object probability image is calculated by applying a backprojection [method] technique disclosed in Swain's article (Swain, et al., "Color Indexing", IJCV, Vol. 7, 1991, pp. 11-32), and basically used for tracking and detecting an object area.

For convenience of explanation, a virtual human face moving horizontally and to the left is shown as an object to be tracked in FIG. 3. If a moving image for object tracking is input through the image input means 200, the face is initially assigned as an object area which is the target of tracking, in the first frame 301 which is the start of the image. The user who desires to track the object in the moving images can specify the area of the tracking object semi-automatically by using a Graphic User Interface (GUI) on an image display apparatus and an input apparatus such as a mouse, a remote control device, a laser pointer, or other input auxiliary means. If tracking is desired to start not from the start of the moving images, but from the middle or other scene, the frame which includes a object of interest and is intended to start to track is assigned as the first frame.

The image input means 200 should have a function capable of displaying moving images in units of a frame, which are received through a communications network, produced using a camera, or generated using a moving picture producing program, to the user through the screen of an apparatus such as a computer. The function may be implemented by software or hardware, which is well-known to a skilled person in the art.

In the histogram calculating means 210, an (object) model (color) histogram M(j) 304 of this initial object area 302 is calculated in step 100. Here, j is a descriptor which represents each bin address of a color histogram, which is expressed as three 1-dimentional memory arrays or one 3-dimensional memory array, in a 1 dimension.

For convenience of explanation, it is assumed that red, green, and blue color [brightness] value of each pixel is represented by color (R, G, B). Assuming that the number of bins needed in expressing each color component value in an RGB color histogram is bin resolution, and we denote n as the bin resolution, the bin resolution (n) can usually be one of the possible values 256, 128, 64, 32, 16, 8, 4, and 2. The brightness resolution of each color component in a color histogram is obtained by dividing the brightness range of each color component by the bin resolution of the color component. For example, if a RGB color system with the brightness range of 256 and with the bin resolution of 32 is used, a 32×32×32 memory array is needed for constructing an RGB color histogram, and the brightness resolution (dR, dG, dB) of each color component is dR=dG=dB=256/32=8.

In an arbitrary pixel having color brightness value (R, G, B), brightness of each color component is divided by brightness resolution, and then the obtained quotient can be used as the bin address value corresponding to the brightness value of the color component, and the RGB color histogram bin count at each bin address value is increased by 1, whenever the individual pixel color value corresponds to the bin address value. For example, when the brightness resolution is 8, and a current pixel color value is (R=13, G=126, B=228), the bin count of the histogram bin address (1, 15, 28) is increased by 1.

By repeatedly performing the above process for all pixels in an arbitrary area, the color histogram calculation process for an arbitrary area is performed. Since this is well-known to a skilled person in the art to which the present invention belongs, detailed explanation will be omitted. The present invention can be applied to other color component systems such as 2-dimensional or 3-dimensional color component systems as well as the RGB color component.

The initial object area/effective window assigning means 220 assigns an initial object area 302, and assigns an initial object effective window 303 of a kind of minimum-sized rectangle containing the initial object area. If the initial object area is determined, the initial object effective window can be automatically determined.

The object search window assigning means 230 assigns an object search window 306 in order to effectively detect the object area changed by the movement of the object from the location in the first frame 301 to the location in the following frame 305 in step 110.

At this time, if the following frame 305 is a current frame, then the first frame 301 will be the previous frame. This relation is similarly applied to the object area and the object effective window. Accordingly, the object effective window assigned in the previous frame is represented as a previous object effective window 307 in the next frame.

The object search window assigning means 230 sets an object search window 306 based on the previous object effective window 307 (or the initial object effective window). At this time, the object search window 306 should be greater than the previous object effective window 307 and include a new tracking object area 308 of an object which is the target of tracking in the next frame 305. At the same time, the object search window 306 should be set at a size small enough to successfully detect the object in the moving picture and make the computational complexity as low as possible.

For the effective determination of the location and size of the object search window 306 the motion information (speed and direction) and size of the object can be considered importantly. If tracking of the object has been performed since an earlier time, there must be information on the motion of the object.

From the image in the object search window 306 set as described above, the input color histogram I(j) 309 about the object search window is obtained in step 120 using the histogram calculating means 210.

The object probability image calculating means 240 calculates the object probability image of the object search window 306 in step 130 using the model histogram M(j) 304 which is the histogram of the initial object area 302 and the input histogram I(j) 309 which is the histogram of the object search window 306. This will now be explained.

First, using the histogram obtained by the method described above, color histogram ratio R(j) 310 is calculated by the following equation 1:

$$R(j) = \min\left(255\frac{M(j)}{I(j)}, 255\right) \quad (1)$$

Here, min(x, y) is a function selecting a smaller value in x and y.

It is preferable that the object probability image 311 is obtained by backprojecting the value of color histogram ratio R(j) 310 corresponding to the color value of each pixel in the input image in the object search window 306, to the pixel. This object probability image indicates the possibility of detecting the tracking target in the current input frame. In FIG. 3, brighter expression for the face area than other areas indicates that the face area has relatively higher possibility of detection.

Figure 4:
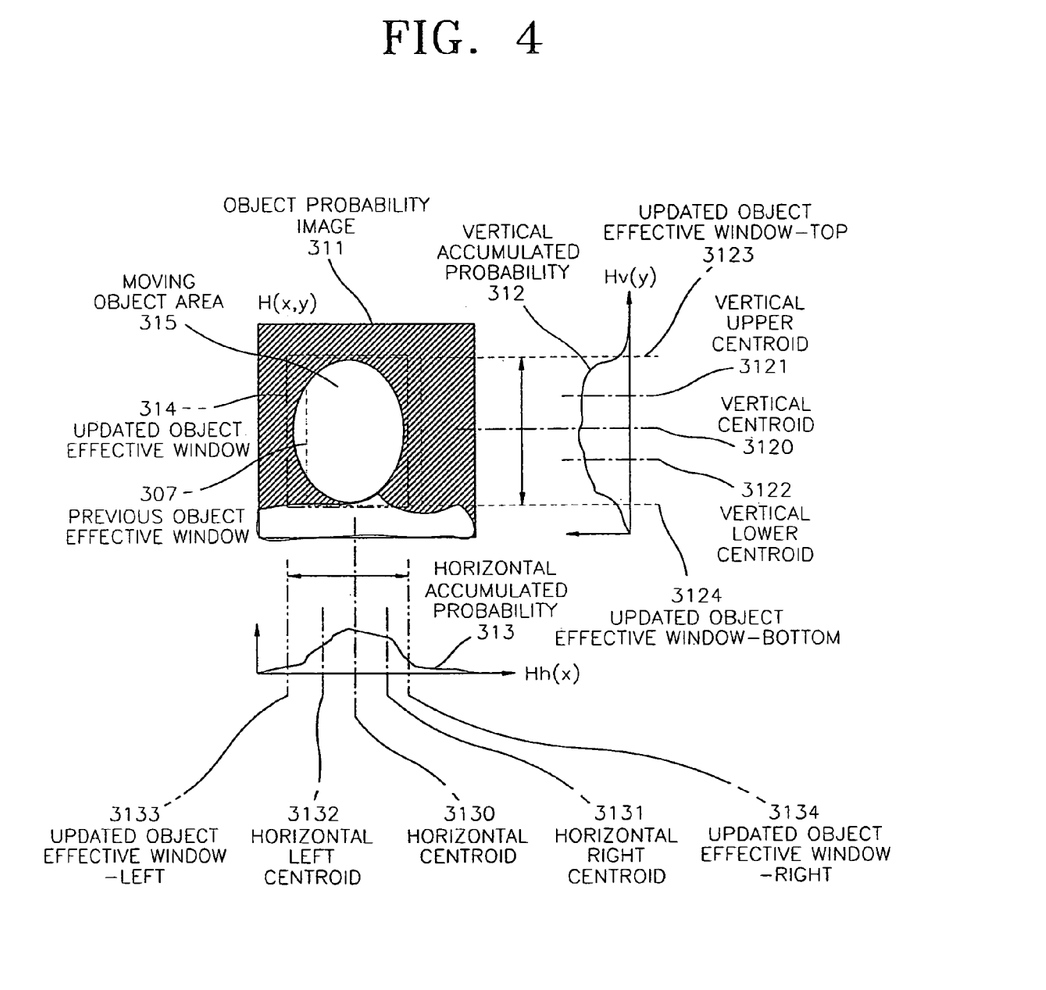
FIG. 4 is a diagram showing a tracking process updating an initial object effective window by using an object probability image.

FIG. 4 is a diagram showing a process updating the previous (or the initial) object effective window 303 by using the object probability image 311. Processing this object probability-image 311 will be explained hereinafter.

In FIG. 3, the object 302 for tracking in the first frame is assigned, and the moved object 308 is expressed in the next frame. In the object probability image 311 in FIG. 4, the tracking object area 308 moved in FIG. 3 is expressed as a moving object area 315. The object effective window updating means 250 sets an updated object effective window 314 which is the minimum bounding rectangle of the moving object area 315 in step 140.

For this, the object probability image 311 and the previous object effective window 307 are used. That is, the new object effective window 314 which is updated by calculating the centroids of two directional 1 D probability functions which is obtained by accumulating the value of each pixel of the object probability image 311 in the horizontal direction and in the vertical direction in the area of the previous object effective window 307, is obtained.

In order to reduce the amount of calculation of the centroids, accumulating the object probability image 311 in the area of the previous object effective window 307 in the horizontal direction, 1-dimensional horizontal accumulated probability Hh(x) 313 is obtained, and accumulating the object probability image 311 in the area of the previous object effective window 307 in the vertical direction, 1-dimensional vertical accumulated probability Hv(y) 312 is obtained.

Next, in order to determine the left boundary 3133 and right boundary 3134 of the updated object effective window 314, the horizontal centroid 3130 of the horizontal accumulated probability function Hh(x) 313 is first obtained. Again, the horizontal left centroid 3132 of the horizontal accumulated probability function Hh(x) to the left of the horizontal centroid 3130 and the horizontal right centroid 3131 of the horizontal accumulated probability function Hh(x) to the right of the horizontal centroid 3130 are obtained.

Then, based on the obtained values, the locations of the left boundary 3133 and right boundary 3134 of the updated object effective window 314 are finally determined. For this, assuming that dx denotes the distance between the horizontal centroid 3130 and the horizontal left centroid 3132, and Dx denotes the distance between the horizontal centroid 3130 and the left boundary 3133 of the updated object effective window 314, the left boundary 3133 of the update object effective window is obtained by the following equation 2:

$$Dx = dx \cdot a \qquad (2)$$

Here, a may be a variable which can be determined with respect to the moving speed at which the object moved in the horizontal direction, or may be a constant value which is empirically determined.

In the same manner, the right boundary 3134 of the update object effective window 314 can be obtained. However, different variable or constant a may be used for the right boundary according to the left-right shape asymmetry of the tracking object.

Likewise, after the vertical centroid 3120 of vertical accumulated probability Hv(y) 312 is obtained, the vertical upper centroid 3121 and the vertical lower centroid 3122 are calculated from the vertical centroid 3120 and the vertical accumulated probability function 312, and the top boundary 3123 and bottom boundary 3124 of the updated object effective window 314 are finally determined based on the centroids 3120, 3121, and 3122.

Assuming that dy denotes the distance between the vertical centroid 3120 and the vertical upper centroid 3121 and Dy denotes the distance between the vertical centroid 3120 and the top boundary 3123 of the updated object effective window 314, the top boundary 3123 of the updated object effective window 314 can be obtained by the following equation 3:

$$Dy = dy \cdot b \qquad (3)$$

Here, b may be a variable which can be determined with respect to the moving speed at which the object moved in the vertical direction, or may be a constant value which is empirically determined. Using the method described above, the bottom boundary 3124 of the updated object effective window 314 can be obtained.

The object effective window updating means 250 newly determines the new object effective window 314 which is updated by the method described above. This updating process is repeatedly performed till the difference of the locations or sizes of the updated new object effective window 314 and the previous object effective window 307 is less than a predetermined value in step 140, or till the iteration number of the updating process is over a predefined number. As a result, the process is repeated till the object which is the target of tracking is included in the updated new object effective window 314 The object area detecting means 260 detects a new object area 315 in the next frame 305 to which the object moved, in the object probability image within the finally converged object effective window 314 in step 150.

It is preferable that in order to detect a new object area in a newly input image from the object probability image, all pixels of the object probability image are binarized as an object region or a non-object region by comparing the pixel value of the object probability image with a predetermined threshold value or a plurality of threshold values.

One of rules about the binarization process of the object probability image for detecting an object area can be defined as the following equation 4:

If $H(x,y) > T$, pixel of $(x,y)$=object region, that is,
Map$(x,y)$=255 otherwise, pixel of $(x,y)$=non-
object region, that is, Map$(x,y)$=0 $\qquad$ (4)

In equation 4, if the object probability image H(x,y) in an arbitrary pixel (x,y) is greater than arbitrary threshold T, the pixel is determined as the object area, and the value 255 is assigned to Map(x,y). Otherwise, the pixel is determined as a non-object area, and the value 0 is assigned to Map(x,y). Thus the obtained binary image Map(x,y) is referred to as a binary map indicating the result of detecting an object area.

T may be empirically given in advance or be adaptively determined by the values of the object probability image.

In the above case, only one threshold is used, and if a binarization method using two thresholds is applied, the object area can be detected more precisely.

By steps 100 through 150, object tracking between a tracking starting frame and its next input frame is accomplished validly.

For continuous tracking of an object, the next frame is taken as a new staring frame, the third frame as a new next frame, the finally obtained object region as a new initial object area in the new starting frame, and then the steps described above are repeatedly performed. Then, an object in video sequences can be tracked continuously in real time.

Preferably for this, the object color histogram of the object area detected in step 150 is calculated using the predetermined bin resolution used in step 100 in step 160 (not shown). The object color histogram calculated in step 160 and the new model color histogram which is updated using the model color histogram calculated in step 100 are calculated using the predetermined bin resolution used in step 100 in step 170 (not shown). Steps 110 through 170 are repeatedly performed by taking the object area detected in step 150 as an initial object area and taking the updated model color histogram calculated in step 170 as a new model color histogram of the tracking object.

Here, it is preferable that in step 170, in order to calculate the new model color histogram ($M_{new}(j)$) of the tracking object by using the object color histogram (P(j)) in step 160 and the model color histogram (M(j)) calculated in step 100, a recursive IIR filter or the Kalman filter which is a linear filter is used.

It is preferable that if the filter gain k is the value ranging from 0 to 1 and a factor for adjusting the speed of updating in the recursive IIR filter, updating of the model color histogram (M(j)) using the object color histogram (P(j)) is expressed as the following equation 5:

$$M_{new}(j) = (1-k) \cdot M(j) + k \cdot P(j) \qquad (5)$$

Also, it is preferable that in step 170, the model color histogram of the moved new object area is calculated by applying the object color histogram (P(j)) in step 160 and the model color histogram (M(j)) calculated in step 100, to a Kalman filter. Color distribution changes of the object area due to lighting condition variation between frames in video sequences can be expressed effectively in 1st or 2nd order dynamic change models. This model histogram updating method can handle effectively the problem of the object color distribution change between frames in video sequences. Therefore, tracking an object can be successfully performed even when the size of the object changes in each image, or moving images are photographed or produced under changing lighting.

Through the process described above, the histogram 304 of FIG. 3 is updated and can be used for the calculation of the object probability image in step 130.

In this way, by detecting the object area in the current input image and updating the model histogram, a cycle of tracking the object is completed robustly. A tracking decision unit (not shown) which determines whether or not to continue the next object tracking cycle judges whether the tracking object exists or disappeared in the current input image, by comparing the size and shape of the detected object area with the previous object area. If it is judged that the tracking object is in the current input image, the next tracking process is continuously performed, and otherwise the tracking process ends.

As described above, since the object tracking method of the present invention is based on the color histogram of the object area, the result of object tracking may be sensitively affected according to the bin resolution of the color histogram.

Therefore, it is preferable that the optimal bin resolution of the color histogram is determined according to a predetermined method before or in step 100, and calculation of the color histogram from step 100 is based on the optimal bin resolution.

That is, preferably, the apparatus of FIG. 2 further includes a means for determining the optimal bin resolution of a histogram which makes an object detection performance index be maximum. The object detection performance index represents how much the initial object area and the object area detected in the starting frame through the image input means 200 coincide, and how much the initial object area is distinguished from the adjacent background (=non-object area) in the object probability image within the object search window. The histogram calculating means 210 calculates the histogram according to the determined optimal bin resolution.

Figure 5:
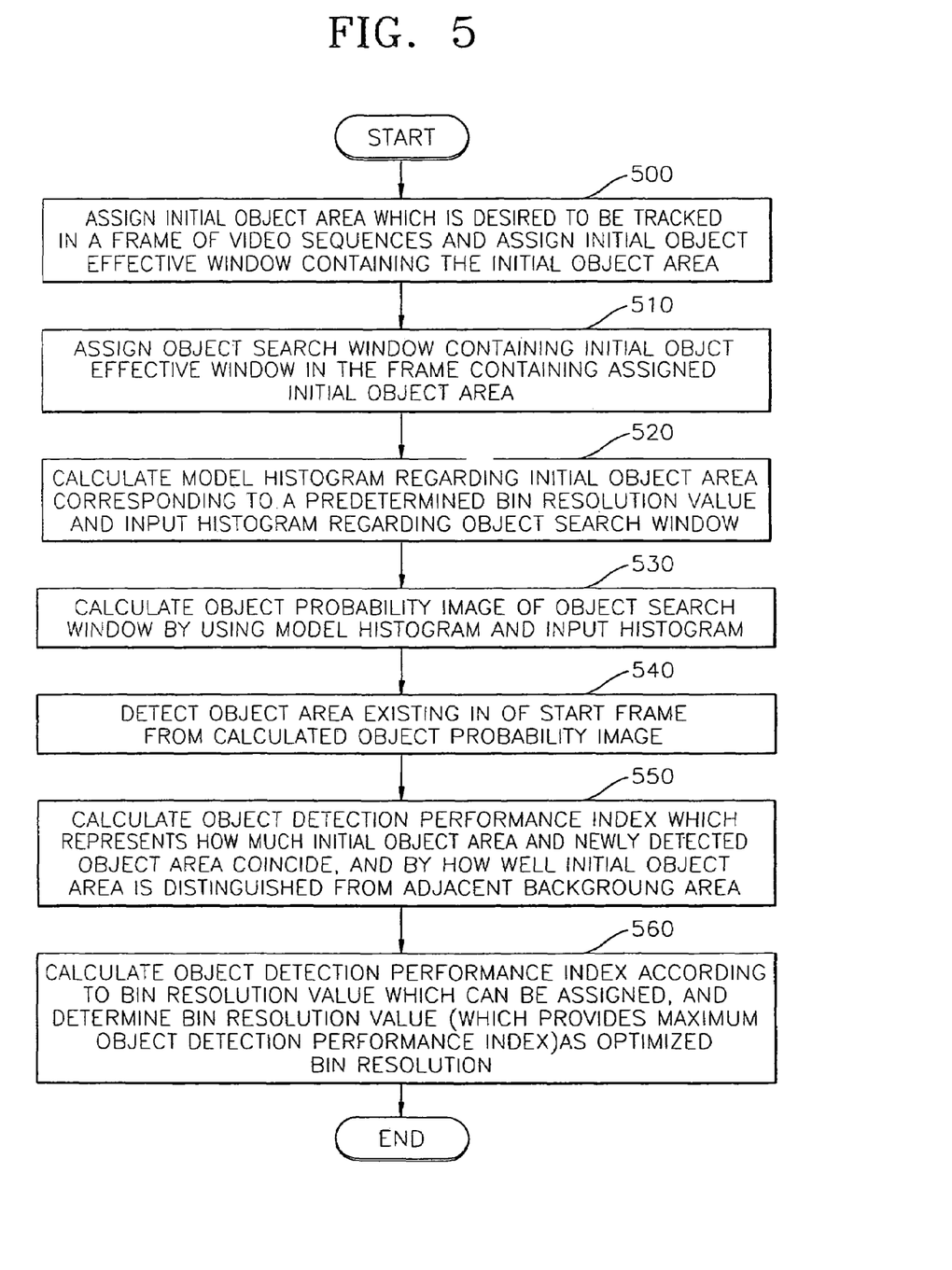
FIG. 5 is a flowchart of a method for optimizing the bin resolution of a color histogram in a process for tracking an object in video sequences according to the present invention.

FIG. 5 is a flowchart of a method for optimizing the bin resolution of a color histogram in a process for tracking an object in video sequences according to the present invention.

An object area which is desired to be tracked is assigned in one frame of video sequences, and from this, an initial object effective window containing the initial object area is assigned in step 500. In the frame containing the object area assigned in step 500, an object search window containing the initial object effective window assigned in step 500 is assigned in step 510. A model histogram of the initial object area corresponding to a predetermined bin resolution value and an input histogram of the image in the object search window are calculated in step 520. Using the model histogram and the input histogram, the object probability image in the object search window is calculated in step 530. Using a predetermined method, from the object probability image calculated in step 530, an object area is again detected in the frame of step 500 in step 540. An object detection performance index which represents how much the initial object area assigned in step 500 and the new object area obtained in step 540 coincide, and how much the initial object area in the object probability image calculated in step 530 is distinguished from the adjacent background (=non-object) area is calculated in step 550. The object detection performance index of each bin resolution value is calculated by repeatedly performing steps 520 through 550 for all bin resolution values that can be assigned, and a bin resolution value which provides the maximum object detection performance index is determined as an optimized bin resolution in step 560.

Since a series of continuous frames containing one desired tracking object usually form moving images for 3~4 seconds, the color distribution characteristic is relatively well kept between the object area and the adjacent background area for an interval of tracking. Therefore, the bin resolution determined as the optimum in the first frame also shows a similar object tracking performance in the following frames. Considering this, the present invention makes the bin resolution optimization process be performed very simply and effectively only in the first frame in which the object area is assigned.

Figure 6:
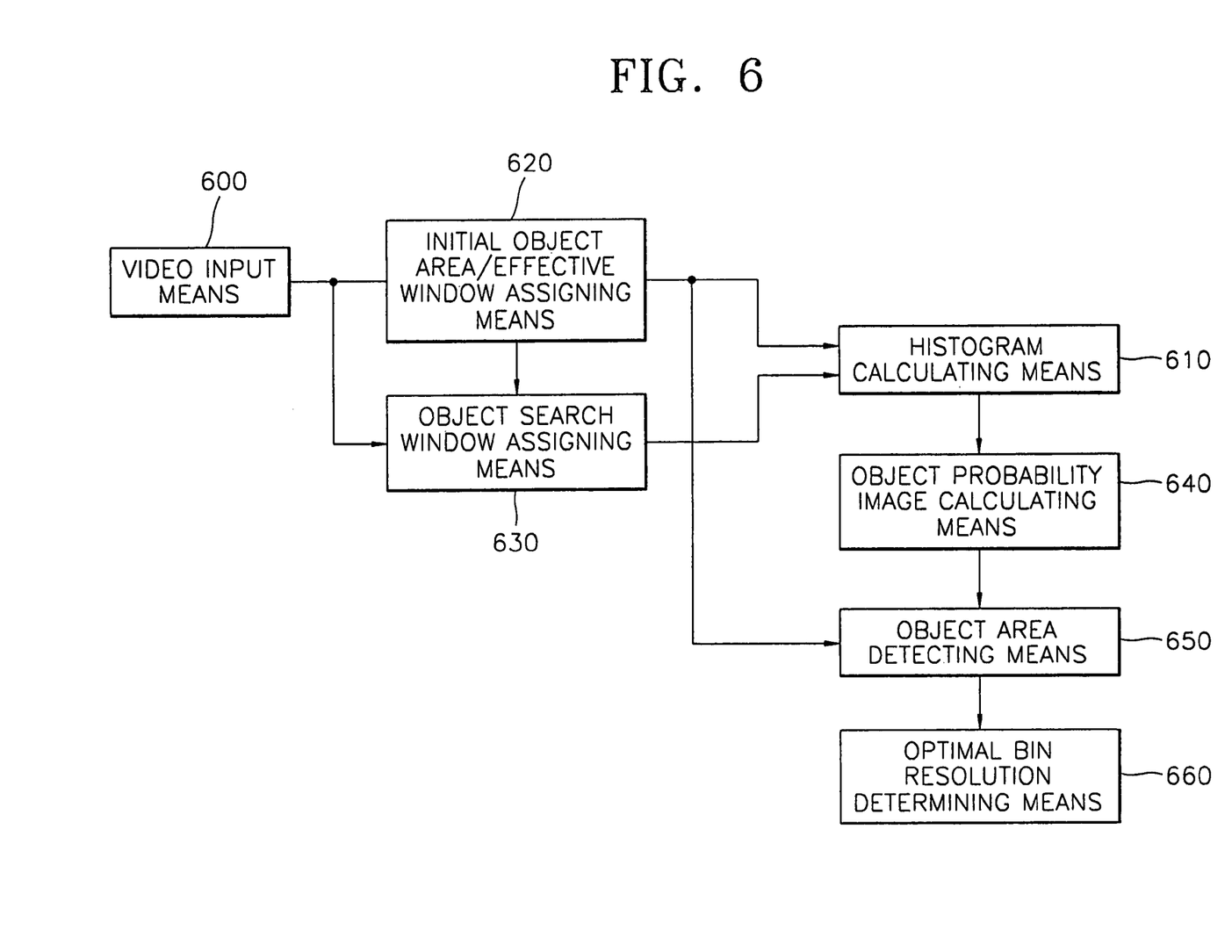
FIG. 6 is a block diagram of the structure of an apparatus for optimizing the bin resolution of a color histogram in a process for tracking an object in video sequences according to the present invention.

FIG. 6 is a block diagram of the structure of an apparatus for optimizing the bin resolution of a color histogram for solid object tracking in video sequences according to the present invention.

The apparatus is composed by means 600 through 660. A video input means 600 receives video sequences. A histogram calculating means 610 calculates a color histogram of an area assigned in a vide image frame, using a predetermined bin resolution. A means 620 assigns an initial object area desired to be tracked in a frame of a moving image input through the image input means 600, and automatically sets an initial object effective window containing the initial object area. A means 630 assigns an object search window containing the set initial object effective window in the frame containing the initial object area. A means 640 calculates the object probability image of an image in the object search window using a model histogram which is a histogram of the initial object area calculated using the histogram calculating means 610, and an input histogram which is an histogram of the image in the object search window. A means 650 performs binarization of the calculated object probability image, and again detects the object area in the first frame. A means 660 determines an object detection performance index which indicates how much the initial object area specified as a ground of truth and the object area obtained in the means for detecting an object area coincide, and how much the initial object area is distinguished from the adjacent background area in the object probability image obtained by the object probability image calculating means 640; calculates an object detection performance index of each of all bin resolution values that can be assigned; and determines a bin resolution value which provides the maximum object detection performance index among the bin resolution values, as an optimized bin resolution.

Referring the method of FIG. 5 and the structure of FIG. 6, the operation for optimizing the bin resolution of the color histogram for solid object tracking in video sequences according to the present invention will now be explained in detail.

Steps 500 through 540 in FIG. 5, except that steps 500 through 540 works only in a first frame and lacks a step for updating an object effective window as step 140 of FIG. 1, are substantially the same as the steps 100 through 150.

Likewise, the functions of elements 600 through 650 of FIG. 6, except the object effective window updating means 250 of FIG. 2, are the same as those of elements 200 through 260 of FIG. 2.

However, the histogram calculating means 210 and the object probability image calculating means 240 of FIG. 2 use only the predetermined bin resolution value, while the histogram calculating means 610 and the object probability image calculating means of FIG. 6 use all bin resolution values that can be assigned.

Accordingly, to avoid redundant explanation, explanation of the parts on FIGS. 5 and 6, being the same as that of FIGS. 1 and 2, will be omitted.

If step 540 is completed, a new detection object area with the initial object area is obtained. The optimal bin resolution determining means 660 calculates an object detection performance index which represents how much the initial object area and the newly detected object area coincide, and how well the initial object area is distinguished from the adjacent background in the object search window in step 550.

Figure 7A:
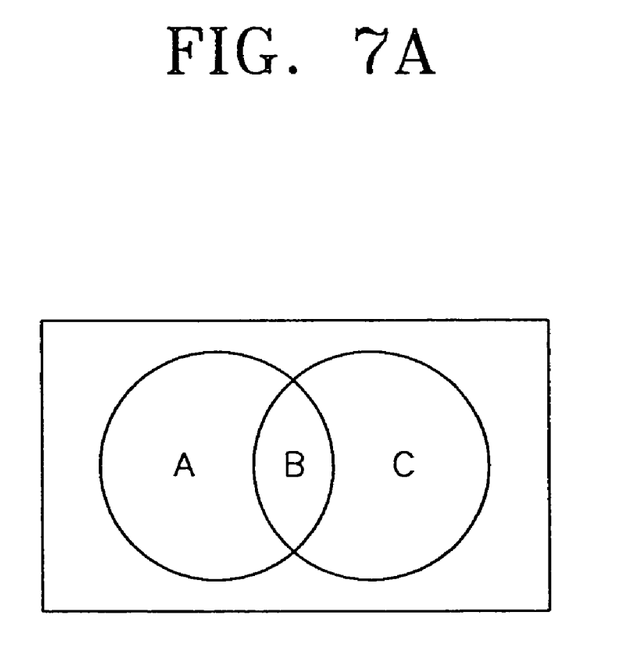
FIG. 7a is a diagram for explaining how much an initial object area in the first frame of tracking and newly detected object area coincide.
Figure 7B:
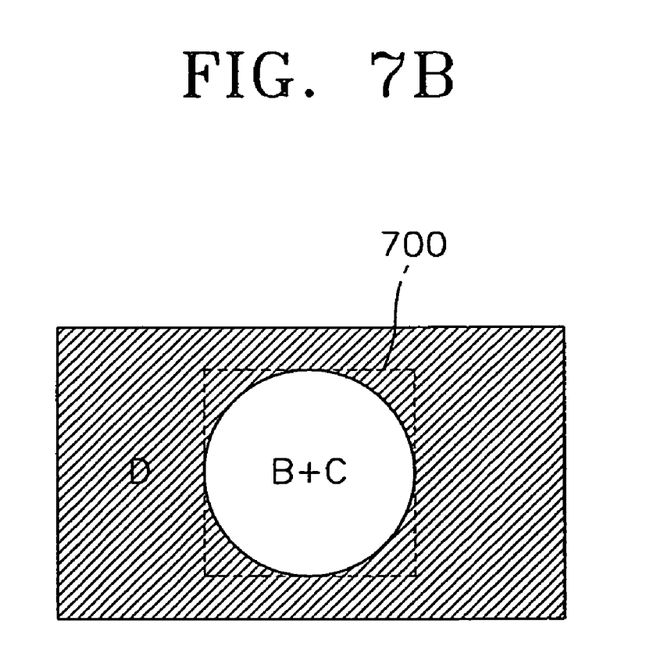
FIG. 7b is a diagram for explaining how well an initial object area is distinguished from an adjacent background area in an object probability image in an object search window calculated in the first frame of tracking.

FIG. 7a is a diagram for explaining how much the initial object area in the first frame of tracking and newly detected object area coincide and FIG. 7b is a diagram for explaining how much the initial object area is distinguished from an adjacent background area in the object probability image in the object search window calculated in the first frame of tracking.

Area (B+C) shown in FIGS. 7a and 7b is the initial object area, and area (A+B) shown in FIG. 7a is a newly detected object area. An area marked by D in FIG. 7b may indicate a background area other than the initial object area (B+C) or the remaining background area excluding the object effective window 700.

Object Segmentation Accuracy (OSA) which indicates how much the initial object area (B+C) and the newly detected object area (A+B) coincide can be defined by multiplication of two area ratios as the following equation 6:

$$OSA = \frac{Area_B}{Area_{(A+B)}} \cdot \frac{Area_B}{Area_{(B+C)}} \quad (6)$$

Here, Area indicates the pixel area of each area.

OSP (Object Segmentation Probability) which indicates how much the initial object area is distinguished from the adjacent background area in the object probability image in the object search window calculated in the first frame can be defined as the following equation 7:

$$OSP = \frac{\sum_{(x,y)\in(B+C)} H(x,y)}{Area_{B+C}} - \frac{\sum_{(x,y)\in D} H(x,y)}{Area_D} \quad (7)$$

Here, H(x, y) indicates the object probability image.

Finally, object detection performance index, that is, Object Segmentation Capability (OSC) can be defined by multiplication of OSA and OSP as the following equation 8:

$$OSC = OSA \cdot OSP \quad (8)$$

After calculating an object detection performance index about one bin resolution, using other bin resolution value, steps 520 through 550 are repeatedly performed. This process is sequentially applied to a set of bin resolution values that can be assigned, for example, this process is sequentially applied to values of 256, 128, 64, 32, 16, 8, and 4.

The optimal bin resolution determining means 660 compares object detection performance indices calculated for a set of bin resolutions, and determines an optimized bin resolution which provides the maximum object detection performance index in step 560.

Since the histogram calculating means 210 calculates the histogram using the optimized bin resolution value, the color-based object tracking performance in video sequences is improved.

Through the process described above, robust tracking a color-based object area is enabled, and obtaining the histogram of the optimal bin resolution needed for the tracking is enabled.

So far, optimum embodiments are explained in the drawings and specification, and though specific terminologies are used here, those were only to explain the present invention. Therefore, the present invention is not restricted to the above-described embodiments and many variations are possible within the spirit and scope of the present invention. The scope of the present invention is not determined by the description but by the accompanying claims.

Also, every step and every element according to the present invention can be implemented, using software with an ordinary programming method, or hardware with programming devices such as a PLD or ASIC, which is easily understood by a person skilled in the art.

The present invention may be embodied in a code, which can be read by a computer, on a computer readable recording medium. The computer readable recording medium includes all kinds of recording apparatuses on which computer readable data are stored.

The computer readable recording media includes storage media such as magnetic storage media (e.g., ROM's, floppy disks, hard disks, etc.), optically readable media (e.g., CD-ROMs, DVDs, etc.) and carrier waves (e.g., transmissions over the Internet). Also, the computer readable recording media can be scattered on computer systems connected through a network and can store and execute a computer readable code in a distributed mode.

Also, the structure of data or a database required in performing the method according to the present invention may be recorded in the recording medium as described above and by operating the computer program, desired functions and effects may be obtained.

According to the present invention, an initial object area in one frame of video sequences desired to be tracked is assigned, and an initial object effective window containing the initial object area is assigned. A frame following the frame containing the assigned initial object area is received as a newly input image, and an object search window containing the initial object area for tracking and its initial object-effective window in the newly input image is assigned. Then, the model histogram of the initial object area corresponding to a predetermined bin resolution value and the input histogram of the image in the object search window are calculated. From the calculated object probability image, using a predetermined method, a new object area to which the initial object area moved is obtained in the next frame in which the initial object area of the frame desired to be tracked is given as a previous (tracked) object area. By doing so, the object in video sequences is tracked continuously. Accordingly, using the continuously extracted video object region information, an object-based interactive-type additional information service function in movies, TV programs, and CFs can be implemented effectively.

Also, in the present invention, since an optimal color histogram bin resolution is determined before a continuous object tracking process begins, more accurate object detection and tracking are enabled. In addition, by also inserting an efficient updating process for an object effective window, an object area detection process, and a model histogram updating process into the tracking process, solid object tracking and area detection are enabled even under changes in object sizes and lighting condition changes.

What is claimed is:

1. A method for optimizing the bin resolution of a color histogram for robustly tracking an object in video sequences, the method comprising:
   (a) assigning an initial object area in one frame of the video sequences desired to be tracked and assigning an initial object effective window containing the initial object area;
   (b) assigning an object search window containing the initial object effective window assigned in the step (a), in the frame containing the object area assigned in the step (a);

(c) calculating a model histogram of the initial object area corresponding to a predetermined bin resolution value and an input histogram of an image in the object search window;

(d) calculating an object probability image of the image in the object search window, by using the model histogram and the input histogram;

(e) detecting an object area, existing in the frame of the step (a) by using a predetermined method, from the object probability image calculated in the step (d);

(f) calculating an object detection performance index which represents how much the initial object area assigned in the step (a) and the new object area obtained in the step (e) coincide, and how well the initial object area is distinguished from an adjacent background area in the object probability image calculated in the step (d); and (g) calculating the object detection performance index for each of all bin resolution values, by repeatedly performing the steps (c) through (f) using all bin resolution values that are available for assigning, and determining a bin resolution value that provides the maximum object detection performance index, as an optimized bin resolution value.

2. The method of claim 1, wherein in the step (e), the object probability image calculated in the step (d) is binarized and an object area for the initial object area in the frame in the step (a) desired to be tracked is obtained.

3. An apparatus for optimizing the bin resolution of a color histogram for robustly tracking an object in video sequences comprising:

an image input means through which the video sequences are input;

a histogram calculating means which calculates a histogram of an image in an area assigned in the video sequence frame, by using a predetermined bin resolution;

a means which assigns an initial object area desired to be tracked, in one frame of the video sequences input through the image input means, and sets an initial object effective window containing the initial object area;

an object search window assigning means which assigns an object search window containing the set initial object effective window in the frame containing the initial object area;

an object probability image calculating means which calculates an object probability image of an image in the object search window, by using a model histogram which is a histogram of the initial object area calculated by using the histogram calculating means, and an input histogram which is a histogram of an image in the object search window;

a means which again detects the object area in the first frame by binarizing the calculated object probability image;

a means which determines an object detection performance index which indicates how much the initial object area and the object area obtained in the means, which again detects the object area, coincide, and how well the initial object area is distinguished from an adjacent background area in the object probability image obtained in the object probability image calculating means; and a means which calculates the object detection performance index for each of all bin resolution values that the object detection performance index determining means is capable of assigning, and, determines a bin resolution value which provides the maximum object detection performance index among the calculated indexes, as an optimized bin resolution.

4. A computer readable medium having embodied thereon a computer program for optimizing the bin resolution of a color histogram for robustly tracking an object in video sequences, wherein the optimizing of the bin resolution of a color histogram comprises:

(a) assigning an initial object area in one frame of the video sequences desired to be tracked and assigning an initial object effective window containing the initial object area;

(b) assigning an object search window containing the initial object effective window assigned in the step (a), in the frame containing the object area assigned in the step (a);

(c) calculating a model histogram of the initial object area corresponding to a predetermined bin resolution value and an input histogram of an image in the object search window;

(d) calculating an object probability image of the image in the object search window, by using the model histogram and the input histogram;

(e) again detecting an object area in the frame of the step (a) by using a predetermined method, from the object probability image calculated in the step (d);

(f) calculating an object detection performance index which represents how much the initial object area assigned in the step (a) and the new object area obtained in the step (e) coincide, and how well the initial object area is distinguished from an adjacent background area in the object probability image calculated in the step (d); and (g) calculating the object detection performance index for each of all bin resolution values, by repeatedly performing the steps (c) through (f) using all bin resolution values that are available for assigning, and determining a bin resolution value that provides the maximum object detection performance index, as an optimized bin resolution value.

* * * * *